(12) United States Patent
Fu et al.

(10) Patent No.: US 12,489,261 B2
(45) Date of Patent: Dec. 2, 2025

(54) CARD SOCKET APPARATUS AND ELECTRONIC DEVICE

(71) Applicant: VIVO MOBILE COMMUNICATION CO., LTD., Dongguan (CN)

(72) Inventors: Shaoru Fu, Dongguan (CN); Zhen Liu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 383 days.

(21) Appl. No.: 18/315,973

(22) Filed: May 11, 2023

(65) Prior Publication Data

US 2023/0283028 A1 Sep. 7, 2023

Related U.S. Application Data

(63) Continuation of application No. PCT/CN2021/132689, filed on Nov. 24, 2021.

(30) Foreign Application Priority Data

Nov. 30, 2020 (CN) .......................... 202011380903.9

(51) Int. Cl.
*H01R 27/02* (2006.01)
*G06K 19/077* (2006.01)
(Continued)

(52) U.S. Cl.
CPC .......... *H01R 27/02* (2013.01); *H01R 12/712* (2013.01); *H01R 12/771* (2013.01); *H01R 12/79* (2013.01); *H01R 13/24* (2013.01); *G06K 19/077* (2013.01)

(58) Field of Classification Search
CPC ...... H01R 27/02; H01R 13/24; H01R 12/712; H01R 12/771; H01R 27/79; G06K 19/077
(Continued)

(56) References Cited

U.S. PATENT DOCUMENTS 6,722,915 B1 * 4/2004 McAlonis ............ H01R 12/721
439/493
7,399,186 B2 * 7/2008 Tsai ...................... H01R 12/62
439/74
(Continued)

FOREIGN PATENT DOCUMENTS

CN 104368485 A 2/2015
CN 104638485 A 5/2015
(Continued)

OTHER PUBLICATIONS

International search report related to Application No. PCT/CN2021/132689; reported on Feb. 15, 2022.
(Continued)

*Primary Examiner* — Gary F Paumen
(74) *Attorney, Agent, or Firm* — von Briesen & Roper, s.c.

(57) ABSTRACT

This application discloses a card socket apparatus and an electronic device, and relates to the technical field of communication devices. The card socket apparatus includes a mainboard, a mainboard upper cover, a support, a first flexible circuit board, and a second flexible circuit board. The mainboard is provided with a first opening, and the mainboard upper cover and the support are separately fixed on two sides of the mainboard. The first flexible circuit board is arranged on the mainboard upper cover, the first flexible circuit board includes a first card socket and a first electrical connection portion, and the first electrical connection portion is electrically connected to the first card socket. The second flexible circuit board is arranged on the support, the second flexible circuit board includes a second card socket and a second electrical connection portion, and the second electrical connection portion is electrically connected to the second card socket. The first card socket and the second card socket are both arranged opposite to the first opening, and a
(Continued)

card mounting space is formed between the first card socket and the second card socket. The first electrical connection portion is electrically connected to the mainboard, and the second electrical connection portion is electrically connected to the mainboard.

20 Claims, 8 Drawing Sheets

(51) Int. Cl.
  *H01R 12/71* (2011.01)
  *H01R 12/77* (2011.01)
  *H01R 12/79* (2011.01)
  *H01R 13/24* (2006.01)

(58) Field of Classification Search
  USPC .......................................................... 439/626
  See application file for complete search history.

(56) References Cited

U.S. PATENT DOCUMENTS

| | | | |
|---|---|---|---|
| 2005/0148244 A1* | 7/2005 | Tsai | H01R 27/02 439/630 |
| 2006/0046567 A1* | 3/2006 | Ho | H01R 12/721 439/607.01 |
| 2007/0105447 A1 | 5/2007 | Tsai et al. | |
| 2015/0126050 A1* | 5/2015 | Ma | H01R 12/592 439/83 |

FOREIGN PATENT DOCUMENTS

| | | | |
|---|---|---|---|
| CN | 109638493 A * | 4/2019 | ......... H01R 12/7082 |
| CN | 209516065 U | 10/2019 | |
| CN | 110571554 A | 12/2019 | |
| CN | 112421321 A | 2/2021 | |
| EP | 3537611 A1 * | 9/2019 | ........... H01R 12/714 |

OTHER PUBLICATIONS

Chinese first Office Action related to Application No. 202011380903.9; reported on Oct. 13, 2021.
Indian first Office Action related to Application No. 202327039005; reported on Mar. 17, 2025.

* cited by examiner

CARD SOCKET APPARATUS AND ELECTRONIC DEVICE

CROSS-REFERENCE TO RELATED APPLICATIONS

This application is a continuation application of PCT International Application No. PCT/CN2021/132689 filed on Nov. 24, 2021, which claims priority to Chinese Patent Application No. 202011380903.9, filed with the China National Intellectual Property Administration on Nov. 30, 2020, and entitled "CARD SOCKET APPARATUS AND ELECTRONIC DEVICE", which is incorporated into this application by reference in its entirety.

TECHNICAL FIELD

This application relates to the technical field of communication devices, and in particular, to a card socket apparatus and an electronic device.

BACKGROUND

Performance of electronic devices continues to be optimized as user needs increase. It is mainly embodied that: more electronic devices carry at least two cards (such as SIM cards). The cards are mounted on a card tray of an electronic device, to fit a card socket in the electronic device by mounting the card tray.

In the process of implementing this application, the applicant further found that currently, the card socket for mounting the two-layer card tray is large in size and occupies a large space in the electronic device.

SUMMARY

A card socket apparatus is provided, including a mainboard, a mainboard upper cover, a support, a first flexible circuit board, and a second flexible circuit board, where
  the mainboard is provided with a first opening, and the mainboard upper cover and the support are separately fixed on two sides of the mainboard;
  the first flexible circuit board is arranged on the mainboard upper cover, the first flexible circuit board includes a first card socket and a first electrical connection portion, the first electrical connection portion is electrically connected to the first card socket, and the first card socket is adapted to connect to a card;
  the second flexible circuit board is arranged on the support, the second flexible circuit board includes a second card socket and a second electrical connection portion, the second electrical connection portion is electrically connected to the second card socket, and the second card socket is adapted to connect to a card;
  the first card socket and the second card socket are separately arranged opposite to the first opening, and the first card socket, the second card socket, and the first opening jointly form a card mounting space; and
  the first electrical connection portion and the second electrical connection portion are separately electrically connected to the mainboard.

An electronic device is provided, including the foregoing card socket apparatus.

Figure 1:
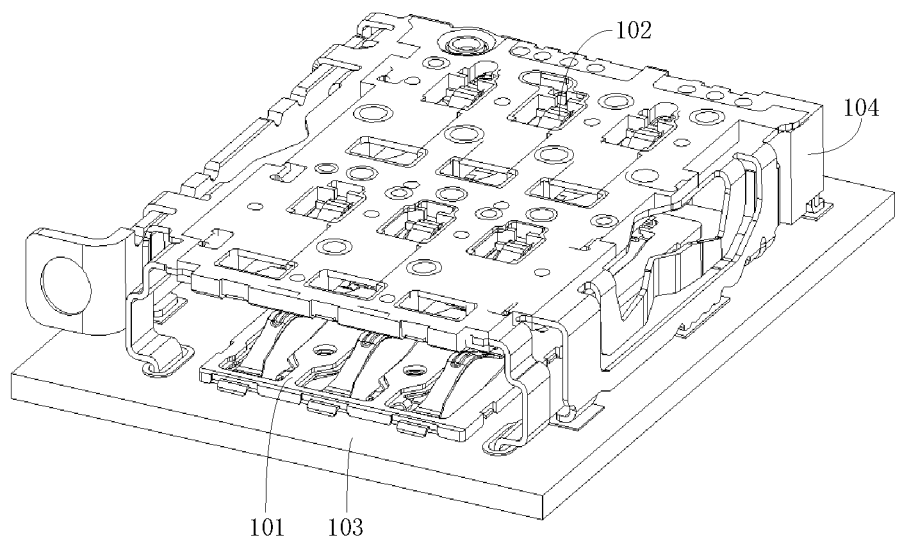
FIG. 1 is an assembly diagram of a card socket for a two-layer card tray.

In the drawings: 101—card socket 1; 102—card socket 2; 103—circuit board; 104—support frame; 1041—iron housing; 1042—plastic portion;
  100—mainboard;
  110—first opening; 120—second opening; 130—third opening; 140—detection elastic piece;
  200—mainboard upper cover;
  210—first strip protrusion; 220—second strip protrusion; 221—guide groove; 230—support bar; 231—hinge shaft;
  300—support;
  310—third strip protrusion; 320—fourth strip protrusion;
  400—first flexible circuit board;
  410—first card socket; 411—first elastic piece; 420—first electrical connection portion; 421—first metal wire; 400a—first insulation layer; 400b—first metal layer;
  500—second flexible circuit board;
  510—second card socket; 511—second elastic piece; 520—second electrical connection portion; 521—second metal wire; 500a—second insulation layer; 500b—second metal layer;
  600—card mounting space;
  610—positioning elastic piece;
  700—ejector rod mechanism;
  710—ejector rod; 720—rotary member;
  800—first electrical connector;
  810—first upper-contact elastic piece; 820—first lower-contact elastic piece;
  900—second electrical connector;
  1000—card tray; and
  1001—positioning groove.

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and so on are intended to distinguish between similar objects but do not indicate a particular order or sequence. It should be understood that the data so used may be interchanged in an appropriate condition, so that the embodiments of this application can be implemented in an order other than those illustrated or described herein. Objects distinguished by the terms of "first", "second", and the like, are usually of a same type, and a quantity of the objects is not limited, for example, one or more first objects may be provided. In addition, "and/or" in this specification and the claims represents at least one of the connected objects. A character "/" generally indicates an "or" relationship between the associated objects.

Figure 2:
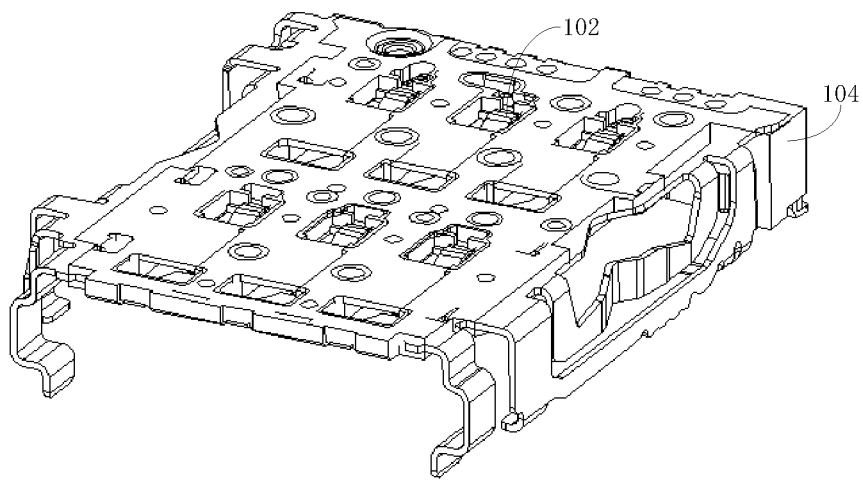
FIG. 2 is a schematic assembly diagram of a support frame.
Figure 3:
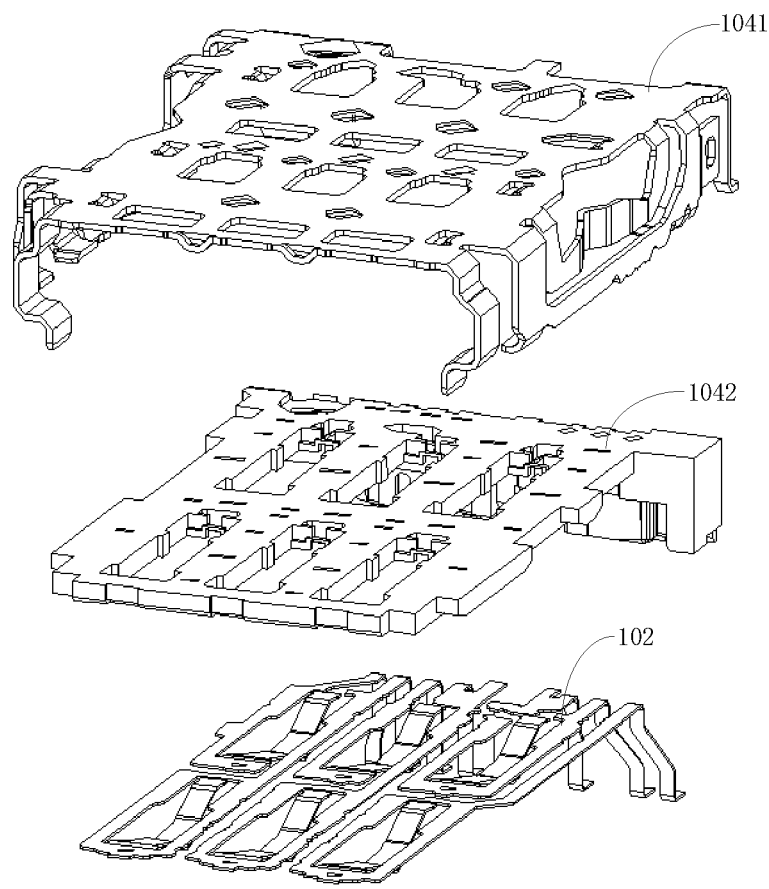
FIG. 3 is a schematic exploded view of a card socket 2 and a support frame.

FIG. 1 to FIG. 3 record a card socket for mounting a two-layer card tray. The card socket includes a card socket 1 101 and a card socket 2 102. The card socket 1 101 is directly arranged on a board surface of a circuit board 103, and the card socket 2 102 is fixed on a support frame 104 in an injection molding manner. The support frame 104 is fixed on the circuit board 103, and forms a card tray holding space with the circuit board 103. After a card tray is mounted in the card tray holding space, cards on two sides of the card tray are separately in conductive contact with the card socket 1 101 and the card socket 2 102. The support frame 104 includes an iron housing 1041 and a plastic portion 1042, and the card socket 2 102 and the iron housing 1041 are in an injection molding connection by the plastic portion 1042.

In the process of implementing this application, the applicant further found that the card socket for mounting the two-layer card tray is large in size and occupies a large space in the electronic device. In addition, in a specific production process, the support frame 104 and the card socket 2 102 need dedicated molds to implement production and manufacturing, leading to high costs of mold manufacturing, and complex manufacturing processes. In a process of injection molding, the card socket 2 102 tends to be warped due to an electrical connection to the circuit board 103 by using a fillet weld leg, affecting stability of the electrical connection.

The following describes a card socket apparatus and an electronic device provided in the embodiments of this application in detail with reference to the accompanying drawings by using specific embodiments and application scenarios thereof.

Referring to FIG. 4 to FIG. 15, the card socket apparatus disclosed in the embodiments of this application includes a mainboard 100, a mainboard upper cover 200, a support 300, a first flexible circuit board 400, and a second flexible circuit board 500.

The mainboard 100 is provided with a first opening 110. The mainboard upper cover 200 and the support 300 are separately fixed on two sides of the mainboard 100, to provide a mounting basis for the first flexible circuit board 400 and the second flexible circuit board 500.

There are many solutions for fixing the mainboard upper cover 200 and the support 300 on two sides of the mainboard 100. Specifically, the mainboard upper cover 200 and the support 300 may be directly connected and fixed to the mainboard 100. Alternatively, the mainboard upper cover 200 and the support 300 are connected and fixed to another component in the electronic device that is located on two sides of the mainboard 100, such as a housing of the electronic device. Alternatively, the mainboard upper cover 200 and the support 300 are connected and fixed to each other.

The first flexible circuit board 400 is arranged on the mainboard upper cover 200, so that the mainboard upper cover 200 can support the first flexible circuit board 400. Similarly, the second flexible circuit board 500 is arranged on the support 300, so that the support 300 can support the second flexible circuit board 500. The first flexible circuit board 400 may be bonded on the mainboard upper cover 200, and the second flexible circuit board 500 may be bonded on the support 300. Optionally, the first flexible circuit board 400 and the second flexible circuit board 500 are bonded and fixed by a double-sided adhesive.

The first flexible circuit board 400 includes a first card socket 410 and a first electrical connection portion 420, the first card socket 410 is adapted to connect to a card, and one objective of the first electrical connection portion 420 is to connect the first card socket 410 and the mainboard 100. Specifically, the first electrical connection portion 420 may be separately electrically connected to the first card socket 410 and the mainboard 100. The second flexible circuit board 500 includes a second card socket 510 and a second electrical connection portion 520, the second card socket 510 is adapted to connect to a card, and one objective of the second electrical connection portion 520 is to connect the second card socket 510 and the mainboard 100. Specifically, the second electrical connection portion 520 may be separately electrically connected to the second card socket 510 and the mainboard 100.

The first electrical connection portion 420 and the second electrical connection portion 520 may be electrically connected to the mainboard 100 in many manners, such as welding, connecting by screw fastening, or bonding by using a conductive adhesive.

In an optional embodiment, the mainboard 100 is provided with a first electrical connector 800 and a second electrical connector 900. The first electrical connection portion 420 is electrically connected to the mainboard 100 by the first electrical connector 800, and the second electrical connection portion 520 is electrically connected to the mainboard 100 by the second electrical connector 900. Specifically, the first electrical connector 800 and the mainboard upper cover 200 are located on the same side of the mainboard 100, and the second electrical connector 900 and the support 300 are located on the same side of the mainboard 100.

The first electrical connection portion 420 is detachably connected to the first electrical connector 800, and the second electrical connection portion 520 is detachably connected to the second electrical connector 900, making it convenient to mount and detach the card socket apparatus.

Figure 12:
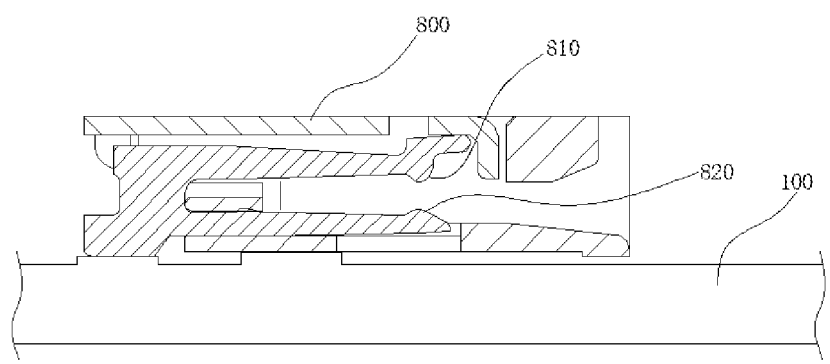
FIG. 12 is a schematic diagram of a first electrical connector disclosed in an embodiment of this application.
Figure 13:
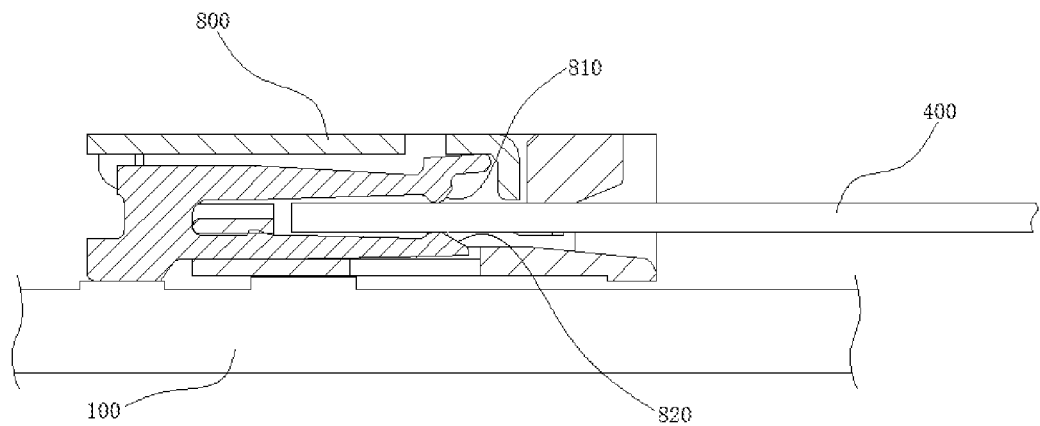
FIG. 13 is a schematic diagram of insertion between a first electrical connector and a first card socket disclosed in an embodiment of this application.
Figure 14:
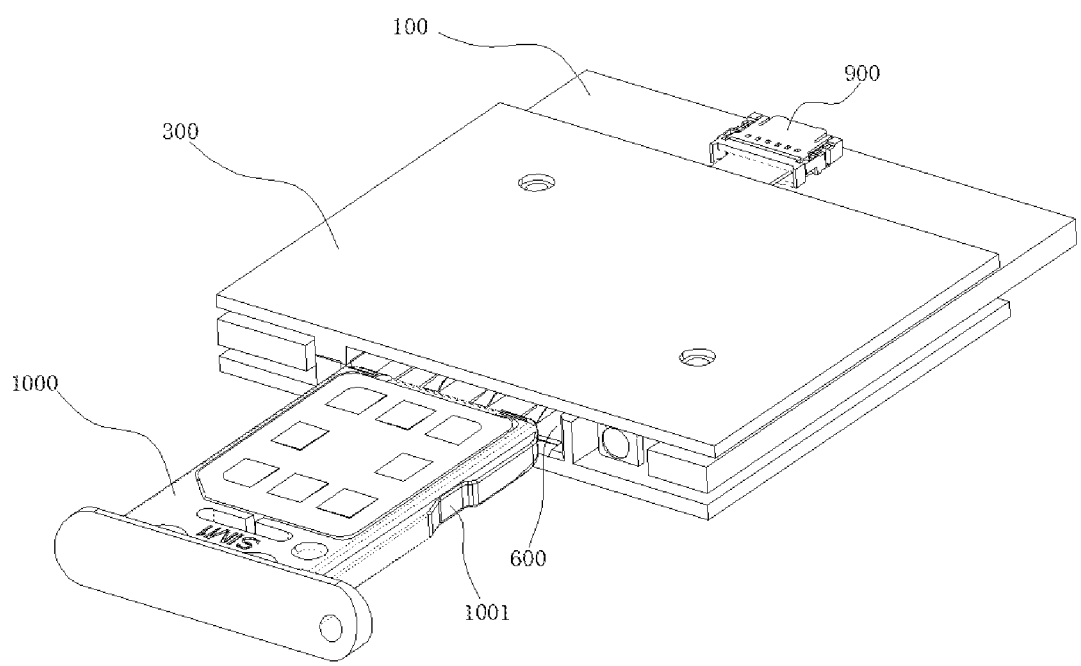
FIG. 14 is a schematic diagram of a card tray and a card socket apparatus disclosed in an embodiment of this application.

Referring to FIG. 12 and FIG. 13, the first electrical connection portion 420 is in insertion fit with the first electrical connector 800. The first electrical connector 800 is provided with a first upper-contact elastic piece 810 and a first lower-contact elastic piece 820. The first upper-contact elastic piece 810 and the first lower-contact elastic piece 820 are electrically connected to the mainboard 100. An insertion space adapted to the first electrical connection portion 420 is formed between the first upper-contact elastic piece 810 and the first lower-contact elastic piece 820, and when the first electrical connection portion 420 is inserted into the insertion space, the first upper-contact elastic piece 810 and the first lower-contact elastic piece 820 are clamped on two sides of the first electrical connection portion 420, and are electrically connected to the first electrical connection portion 420.

The second electrical connection portion 520 is in insertion fit with the second electrical connector 900. Optionally, the first electrical connector 800 and the second electrical connector 900 may be ZIF connectors.

The first card socket 410 and the second card socket 510 are separately arranged opposite to the first opening 110, and a card mounting space 600 is formed between the first card socket 410 and the second card socket 510. The first card socket 410 and the second card socket 510 are arranged opposite to the first opening 110, so that the card mounting space 600 is located in the first opening 110, not only to avoid overlapping between the mainboard 100 and the card mounting space 600, but also to better use spaces of two sides of the mainboard 100, thereby reducing a thickness of the card socket apparatus inside the electronic device, and improving utilization of the space inside the electronic device.

Optionally, a gap between the mainboard upper cover 200 and the support 300 is set to be adjustable. Specifically, a position of at least one of the mainboard upper cover 200 or the support 300 is adjustable. A gap between the first card socket 410 and the second card socket 510 is adjusted by adjusting the gap between the mainboard upper cover 200 and the support 300, that is, a size of the card mounting space 600 is adjusted, to adapt to cards of different thicknesses. It should be noted that, the at least one of the mainboard upper cover 200 or the support 300 may be adjusted and fixed in many manners. For example, the mainboard upper cover 200 and the support 300 are connected and fixed to each other by using a screw, and the gap between the mainboard upper cover 200 and the support 300 is adjusted by adjusting the screw for fixing the mainboard upper cover 200 or the support 300. The card mounting space 600 may be for mounting smart cards.

In an optional embodiment, the first electrical connector 800 and the second electrical connector 900 are both located outside the card mounting space 600, an end portion of the first electrical connection portion 420 extends out of the card mounting space 600 and is electrically connected to the first electrical connector 800, and an end portion of the second electrical connection portion 520 extends out of the card mounting space 600 and is electrically connected to the second electrical connector 900. The card mounting space 600 is narrow, and in this design, the first electrical connector 800 and the second electrical connector 900 are prevented from occupying the card mounting space 600, thereby simplifying an internal structure of the card mounting space 600, and reducing manufacturing difficulties of the card socket apparatus.

Referring to FIG. 4, FIG. 5, and FIG. 8 to FIG. 10, the first card socket 410 includes a first socket body and a first elastic piece 411. Optionally, the first elastic piece 411 protrudes from the first socket body toward the card mounting space 600, so that the first elastic piece 411 can be electrically connected to a card in the card mounting space 600. Optionally, the first elastic piece 411 is provided with a first electrical connection bump, and the electrical connection bump protrudes from an inner wall of the card mounting space 600, to be electrically connected to a card in the card mounting space 600. Specifically, the first electrical connection bump is formed by bending the first elastic piece 411.

Figure 7:
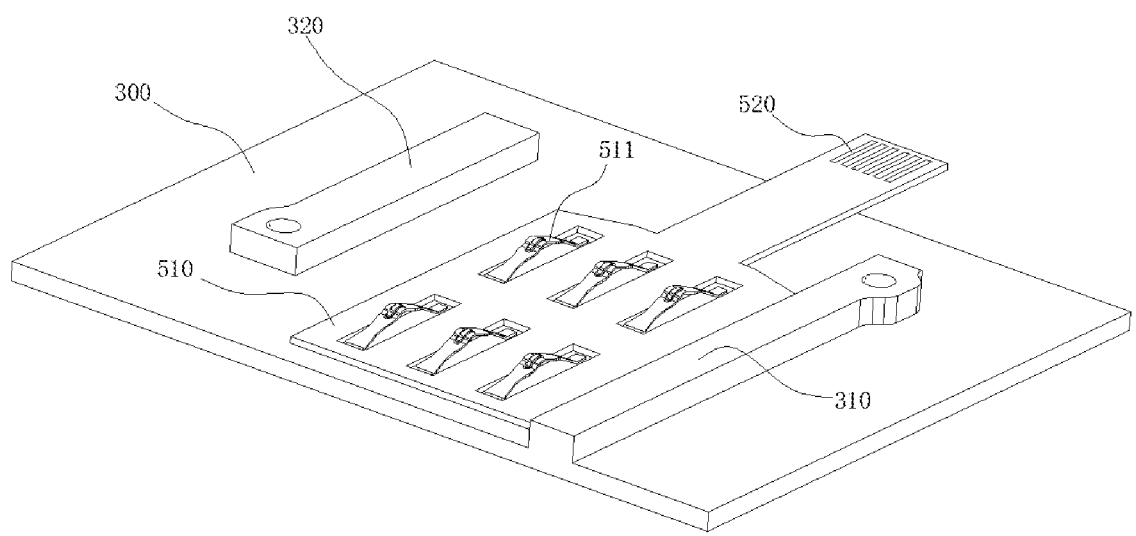
FIG. 7 is a schematic assembly diagram of a support and a second card socket disclosed in an embodiment of this application.
Figure 8:
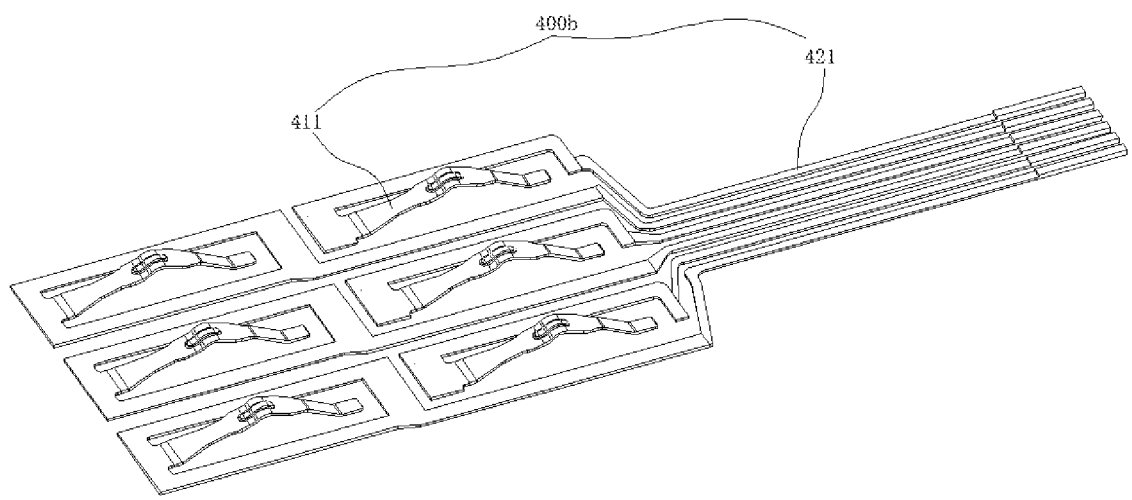
FIG. 8 is a schematic diagram of a first metal layer disclosed in an embodiment of this application.

Referring to FIG. 7 and FIG. 8, the first electrical connection portion 420 includes a first metal wire 421, one end of the first metal wire 421 is electrically connected to the first elastic piece 411, and the other end is electrically connected to the mainboard 100. Optionally, the first metal wire 421 and the first elastic piece 411 are integrally formed.

The first flexible circuit board 400 further includes a first insulation layer 400a and a first metal layer 400b, a partial surface of the first metal layer 400b is provided with the first insulation layer 400a, and the first elastic piece 411 is formed by stamping the first metal layer 400b not provided with the first insulation layer 400a. That is, the first elastic piece 411 is formed by stamping a part of the first metal layer 400b not provided with the first insulation layer 400a.

Referring to FIG. 7 to FIG. 10, the second card socket 510 includes a second socket body and a second elastic piece 511. Optionally, the second elastic piece 511 protrudes from the second socket body toward the card mounting space 600, so that the second elastic piece 511 can be electrically connected to a card in the card mounting space 600. Optionally, the second elastic piece 511 is provided with a second electrical connection bump, and the electrical connection bump protrudes from the inner wall of the card mounting space 600, to be electrically connected to a card in the card mounting space 600. Specifically, the second electrical connection bump is formed by bending the second elastic piece 511.

Referring to FIG. 7 to FIG. 10, the second electrical connection portion 520 includes a second metal wire 521, one end of the second metal wire 521 is electrically connected to the second elastic piece 511, and the other end is electrically connected to the mainboard 100. Optionally, the second metal wire 521 and the second elastic piece 511 are integrally formed.

The second flexible circuit board 500 further includes a second insulation layer 500a and a second metal layer 500b, a partial surface of the second metal layer 500b is provided with the second insulation layer 500a, and the second elastic piece 511 is formed by stamping the second metal layer 500b not provided with the second insulation layer 500a. That is, the second elastic piece 511 is formed by stamping a part of the second metal layer 500b not provided with the second insulation layer 500a.

In this application, the first card socket 410 and the second card socket 510 in the card socket apparatus may be arranged to be the same, that is, the first card socket 410 and the second card socket 510 may be arranged to be the same, thereby improving versatility of the first card socket 410 and the second card socket 510. Similarly, the first electrical connector 800 and the second electrical connector 900 may be arranged be the same structure.

Referring to FIG. 4 to FIG. 7, the mainboard upper cover 200 is provided with a first strip protrusion 210 and a second strip protrusion 220, the first strip protrusion 210 and the second strip protrusion 220 are located on two sides of the first card socket 410, and the first strip protrusion 210 and the second strip protrusion 220 form at least a partial sidewall of the card mounting space 600.

Specifically, the first strip protrusion 210 and the second strip protrusion 220 are arranged to be parallel to two opposite inner sidewalls in the first opening 110. The first strip protrusion 210 and the second strip protrusion 220 are configured as the sidewalls of the card mounting space 600, so that the size of the card mounting space 600 can be adjusted by changing a protruding height of the first strip protrusion 210 and the second strip protrusion 220. A thickness of the mainboard 100 is constant, while a thickness of a card varies. When a thickness of the card tray 1000 mounted with a card is greater than the thickness of the mainboard 100, the protruding height of the first strip protrusion 210 and the second strip protrusion 220 can be set as required, to form a sufficiently large card mounting space 600.

Referring to FIG. 4 to FIG. 7, the support 300 is provided with a third strip protrusion 310 and a fourth strip protrusion 320, the third strip protrusion 310 and the fourth strip protrusion 320 are located on two sides of the second card socket 510, and the third strip protrusion 310 and the fourth strip protrusion 320 form at least a partial sidewall of the card mounting space 600.

The third strip protrusion 310 and the fourth strip protrusion 320 are arranged to be parallel to two opposite inner sidewalls in the first opening 110. The third strip protrusion 310 and the fourth strip protrusion 320 form at least a partial sidewall of the card mounting space 600, so that the size of the card mounting space 600 can be adjusted by changing a protruding height of the third strip protrusion 310 and the fourth strip protrusion 320.

Figure 4:
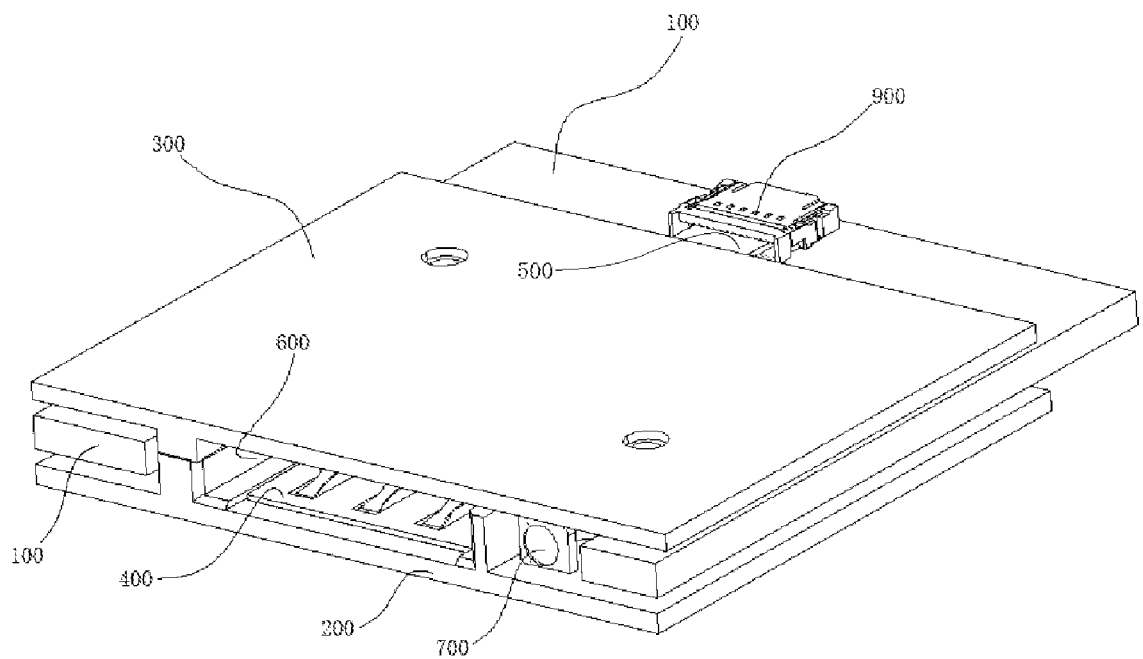
FIG. 4 is a schematic diagram of a card socket apparatus disclosed in an embodiment of this application.

Referring to FIG. 4, the first strip protrusion 210 and the third strip protrusion 310 are arranged opposite to each other, and the second strip protrusion 220 and the fourth strip protrusion 320 are arranged opposite to each other.

In an optional embodiment, the first strip protrusion 210 and the third strip protrusion 310, and the second strip protrusion 220 and the fourth strip protrusion 320 are recessed in the first opening 110, so that the first strip protrusion 210 and the third strip protrusion 310, and the second strip protrusion 220 and the fourth strip protrusion 320 can be positioned in the first opening 110. Optionally, the first strip protrusion 210 and the third strip protrusion 310 are opposite and connected to each other by abutting, and the second strip protrusions 220 and the fourth strip protrusion 320 are opposite and connected to each other by abutting, to prevent the mainboard upper cover 200 and the support 300 from clamping the mainboard 100, so as to protect the mainboard 100.

In another optional embodiment, the first strip protrusion 210 and the third strip protrusion 310 clamp the mainboard 100. The second strip protrusion 220 and the fourth strip protrusion 320 clamp the mainboard 100, to form the sidewalls of the card mounting space 600 by the first strip protrusion 210, the third strip protrusion 310, the second strip protrusion 220, the fourth strip protrusion 320, and inner sidewalls of the first opening 110 jointly. In this implementation solution, an inner space of the first opening 110 can be fully used.

A second opening 120 and a third opening 130 are provided at an opening edge of the first opening 110, the first strip protrusion 210 is fixedly connected to the third strip protrusion 310 by a first connection portion, the second opening 120 and the first connection portion are in an avoidance fit, the second strip protrusion 220 is fixedly connected to the fourth strip protrusion 320 by a second connection portion, and the third opening 130 and the second connection portion are in an avoidance fit. By configuring the second opening 120 and the third opening 130, impact on the mainboard 100 caused by a connection stress between the first strip protrusion 210 and the third strip protrusion 310 and a connection stress between the second strip protrusion 220 and the fourth strip protrusion 320 can be effectively avoided, which is especially applicable to electronic devices with high requirements for mounting the mainboard 100.

The card socket apparatus further includes an ejector rod mechanism 700, the ejector rod mechanism 700 includes an ejector rod 710 and a rotary member 720, and a first end of the card mounting space 600 is an open end. The rotary member 720 is located on a second end of the card mounting space 600 and is rotatably arranged on the mainboard upper cover 200. The second strip protrusion 220 is provided with a guide groove 221, and the ejector rod 710 is slidably arranged in the guide groove 221 to limit a movement trace of the ejector rod 710 for guiding. The ejector rod 710 is located on the second end of the card mounting space 600 and is rotatably connected to a first end of the rotary member 720, and a second end of the rotary member 720 is a push end for removing a card, to push the card tray 1000 to move out of the card mounting space 600.

For convenience of detaching the card tray 1000, in an optional solution, the ejector rod mechanism 700 in the card socket apparatus disclosed in the embodiments of this application is configured to eject the card tray 1000 out, to finally detach the card tray 1000.

Figure 5:
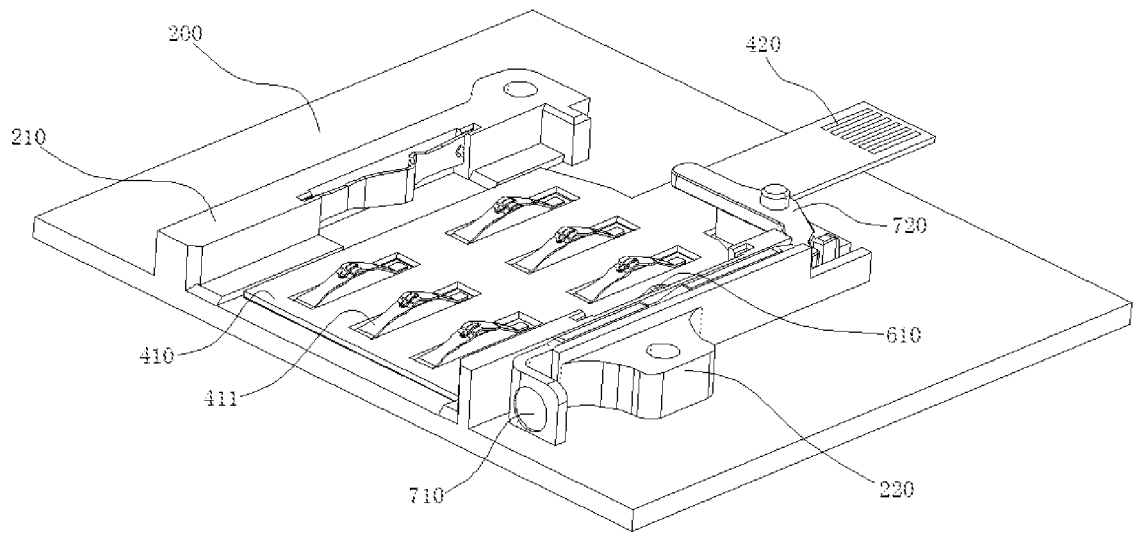
FIG. 5 is a schematic assembly diagram of a first card socket and a mainboard upper cover disclosed in an embodiment of this application.
Figure 6:
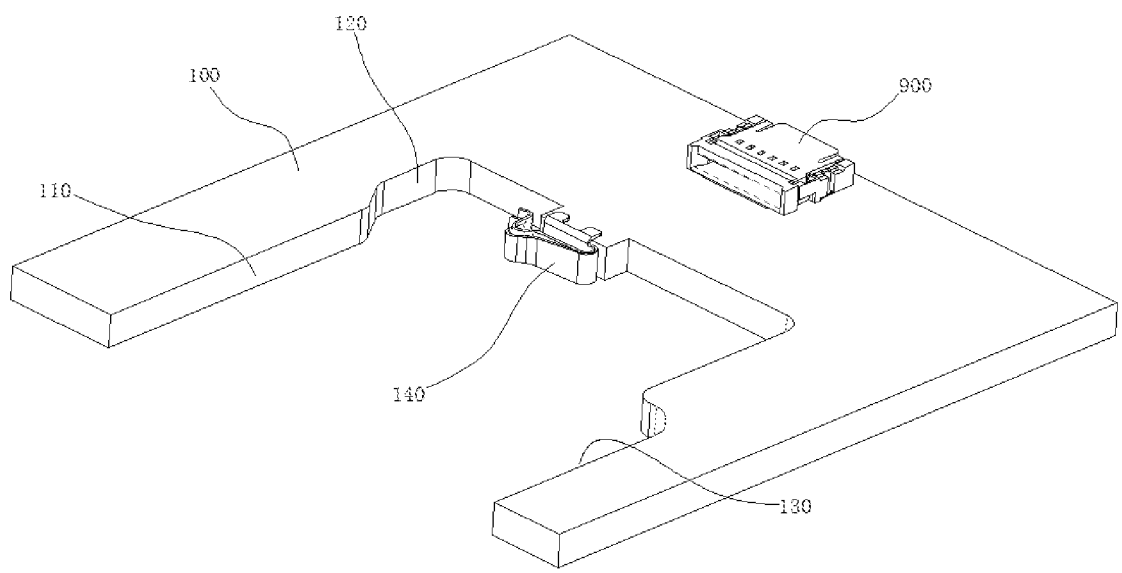
FIG. 6 is a schematic diagram of a mainboard disclosed in an embodiment of this application.
Figure 15:
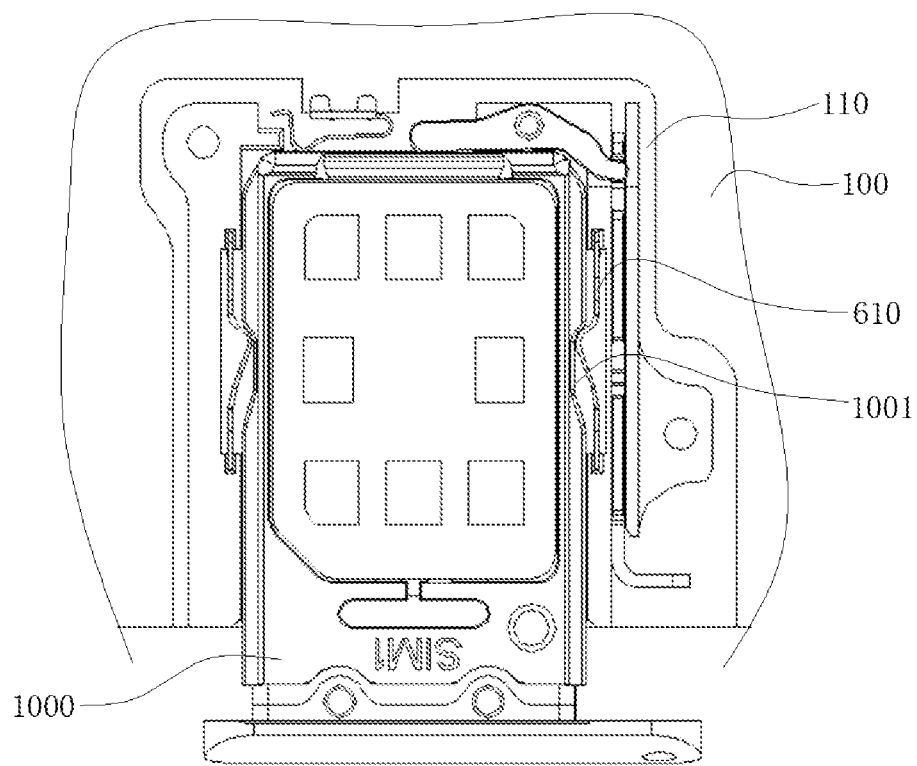
FIG. 15 is a schematic diagram of clamping between a positioning elastic piece and a positioning card groove disclosed in an embodiment of this application.

Still referring to FIG. 5 and FIG. 15, in a specific implementation, the ejector rod mechanism 700 may include the ejector rod 710 and the rotary member 720. The ejector rod 710 is slidably arranged on the mainboard upper cover 200. The first end of the card mounting space 600 is an open end, and the rotary member 720 is located on the second end of the card mounting space 600 and is rotatably arranged on the mainboard upper cover 200. One end of the ejector rod 710 is an ejector pin control end, one end of the rotary member 720 and the other end of the ejector rod 710 are in a driving connection, and the other end of the rotary member 720 is configured to be in contact with the card tray 1000. In this case, an ejector pin hole needs to be reserved on the housing of the electronic device. In a process of detaching the card tray 1000 by a user, an ejector pin is inserted into the ejector pin hole to be in contact with the ejector pin control end, and with continuous push of the ejector pin, the ejector rod 710 slides relative to the mainboard upper cover 200. The sliding of the ejector rod 710 can push the rotary member 720 to rotate, and the other end of the rotary member 720, due to the contact with the card tray 1000, can push the card tray 1000 out during the rotation process, so that the card tray 1000 finally protrudes from an outer surface of the housing of the electronic device, and the user can grasp the card tray 1000 to pull the card tray 1000 out, and finally take the card out of the card tray 1000.

To make the ejector rod 710 slide more stably, in an optional solution, the second strip protrusion 220 is provided with the guide groove 221, and the ejector rod 710 is slidably arranged in the guide groove 221 and is configured to slide along the guide groove 221.

For convenience of driving the card tray 1000 by the rotary member 720, the mainboard upper cover 200 may further include a support bar 230, the support bar 230 is arranged on the second end of the card mounting space 600, and the rotary member 720 is rotatably arranged on the support bar 230. With a support action of the support bar 230, the rotary member 720 is easier to be mounted at a height adapted to the card tray 1000. In this case, the support bar 230 can further be used for limiting. After being mounted in place, the card tray 1000 may be in limiting contact with the support bar 230, to avoid excessive extension into the card mounting space 600.

For convenience of assembly, the support bar 230 may be provided with a hinge shaft 231, the rotary member 720 may be configured with a hinge hole adapted to the hinge shaft 231, and the hinge shaft 231 rotatably fits the hinge hole. Certainly, the hinge hole may be alternatively provided on the support bar 230, and correspondingly, the hinge shaft 231 is arranged on the rotary member 720.

On the premise that the mainboard upper cover 200 includes the support bar 230, one end of the support bar 230 is connected to a first sidewall of the card mounting space 600, the other end of the support bar 230 extends toward a second sidewall of the card mounting space 600, and an avoidance opening is provided between the other end of the support bar 230 and the second sidewall. The mainboard 100 is provided with a detection elastic piece 140, the detection elastic piece 140 extends into the card mounting space 600 through the avoidance opening, and in a state that the card tray is mounted in the card mounting space 600, the card tray 1000 abuts the detection elastic piece 140, and the detection elastic piece 140 is separated from the support bar 230; and in a state that the card tray 1000 is detached from the card mounting space 600, the detection elastic piece 140 is in electrical contact with the support bar 230.

In a specific detection process, the card socket apparatus usually further includes a detection apparatus, after the card tray 1000 is mounted in the card mounting space 600, the card tray 1000 abuts the detection elastic piece 140, and the detection elastic piece 140 is separated from the support bar 230 under the abutting of the card tray 1000. In this case, the detection apparatus detects a high impedance between the detection elastic piece 140 and the support bar 230, and in this case, the electronic device determines that the card tray 1000 is mounted in place based on a detection result of the detection apparatus. In the state that the card tray 1000 is detached, the detection elastic piece 140 is not affected by the card tray 1000, and the detection elastic piece 140 is in electrical contact with the support bar 230 under an action of its own elasticity. In this case, the detection apparatus detects a low impedance between the detection elastic piece 140 and the support bar 230, and in this case, the electronic device determines that the card tray 1000 is in a detached state or an improperly mounted state based on a detection result of the detection apparatus.

The first electrical connection portion 420 is a strip structure portion, a first end of the first electrical connection portion 420 is connected to the first card socket 410, and a second end of the first electrical connection portion 420 penetrates through the card mounting space 600 and is electrically connected to the mainboard 100. Optionally, one end of the first metal wire 421 that is opposite to the first elastic piece 411 is partially exposed on the first insulation layer 400*a*, to form the strip structure portion. Specifically, one end of the first electrical connection portion 420 that is opposite to the first card socket 410 is a connecting finger interface.

The second electrical connection portion 520 is a strip structure portion, a first end of the second electrical connection portion 520 is connected to the second card socket 510, and a second end of the second electrical connection portion 520 penetrates through the card mounting space 600 and is electrically connected to the mainboard 100. Optionally, one end of the second metal wire 521 that is opposite to the second elastic piece 511 is partially exposed on the second insulation layer 500*a*, to from the strip structure portion. Specifically, one end of the second electrical connection portion 520 that is opposite to the second card socket 510 is a connecting finger interface.

Figure 9:
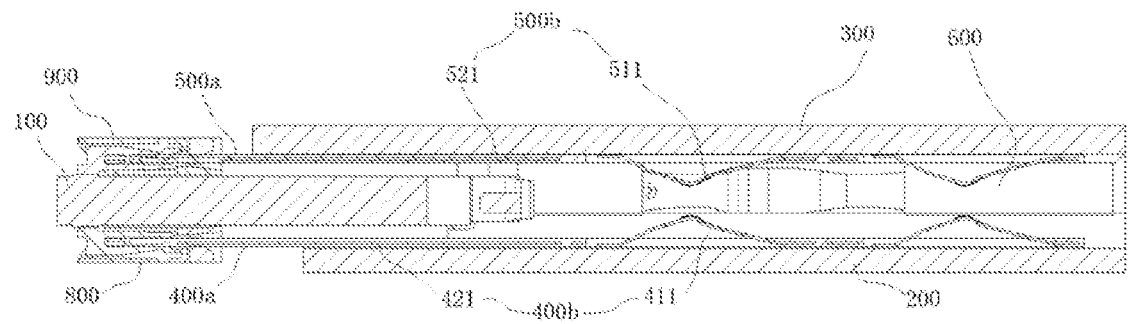
FIG. 9 is a cross-sectional view of a card socket apparatus disclosed in an embodiment of this application.
Figure 10:
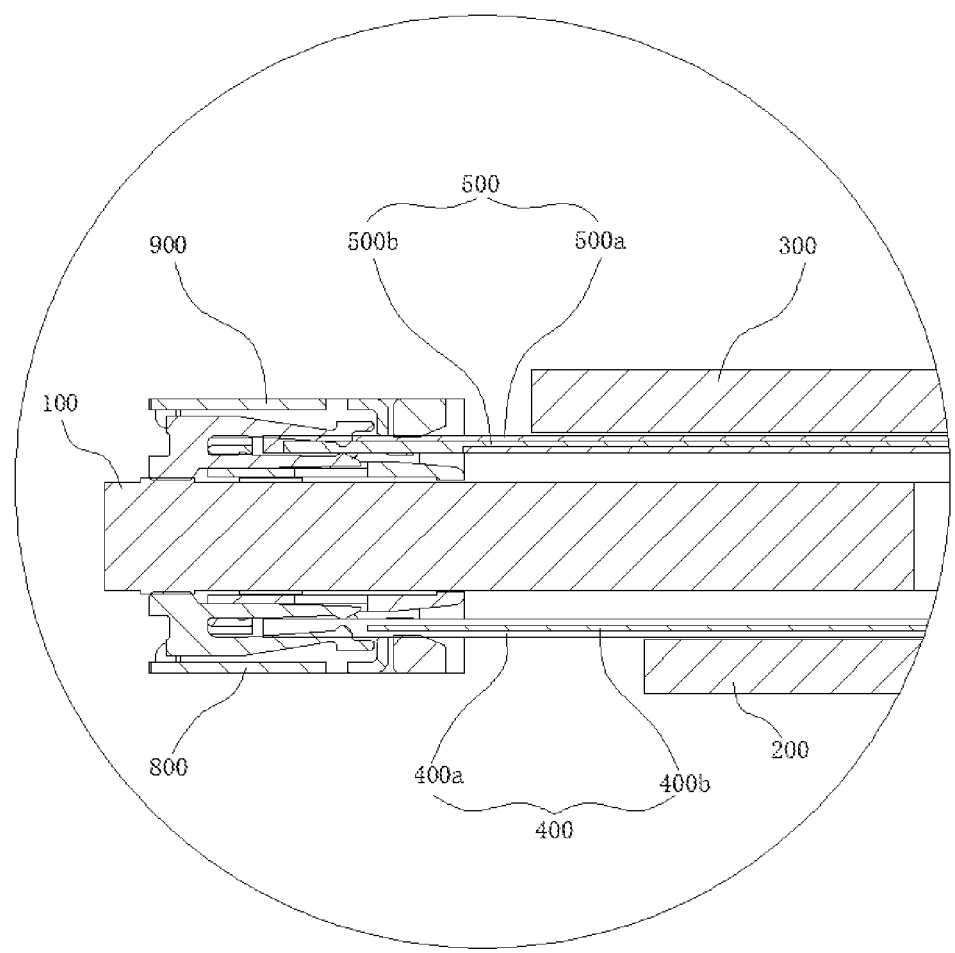
FIG. 10 is a schematic partial enlarged view in FIG. 9.

Referring to FIG. 9 and FIG. 10, a part of the first electrical connection portion 420 that penetrates through the card mounting space 600 is a first part, a part of the second electrical connection portion 520 that penetrates through the card mounting space 600 is a second part, and the first part and the second part are separately attached to two board surfaces of the mainboard 100 that are opposite to the first part and the second part, so that structures at the electrical connections between the first electrical connection portion 420 and the mainboard 100 and between the second electrical connection portion 520 and the mainboard 100 are more compact, and stability of the electrical connections can be improved.

Based on the card socket apparatus disclosed in embodiments of this application, this application discloses an electronic device, and the disclosed electronic device includes the card socket apparatus described in the foregoing embodiments.

The electronic device further includes a card tray 1000. One objective of the card tray 1000 is to position and place a card. The card tray 1000 is detachably adapted to the card mounting space 600. The card tray 1000 may be provided with a first card mounting groove and a second card mounting groove, the first card mounting groove is arranged corresponding to the first card socket 410, and the second card mounting groove is arranged corresponding to the second card socket 510. The first card mounting groove is used to mount a first card, and the second card mounting groove is used to mount a second card. When the card tray 1000 is mounted in the card mounting space 600, the first card mounted in the first card mounting groove is electrically connected to the first card socket 410, and the second card mounted in the second card mounting groove is electrically connected to the second card socket 510.

Figure 11:
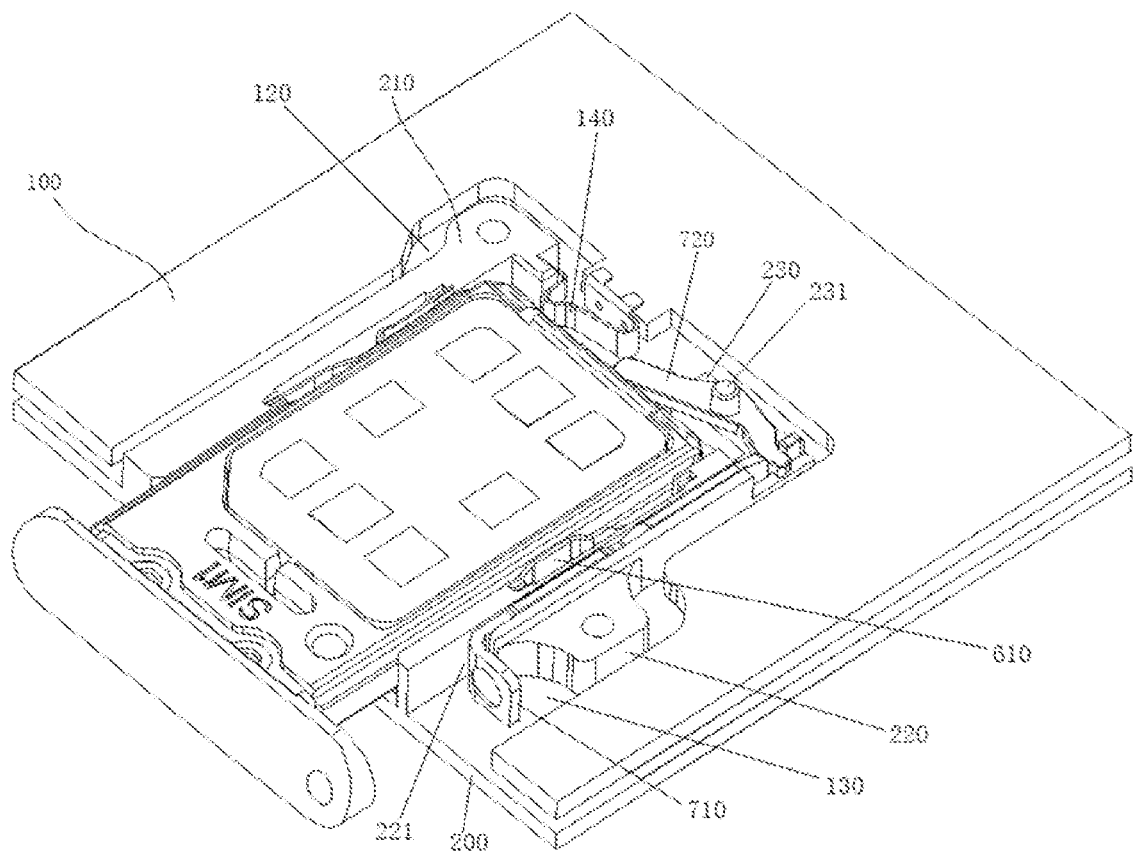
FIG. 11 is a schematic assembly diagram of an ejector rod mechanism disclosed in an embodiment of this application.

Referring to FIG. 11 and FIG. 15, a positioning elastic piece 610 is arranged on a sidewall of the card mounting space 600, and the positioning elastic piece 610 protrudes from the sidewall of the card mounting space 600, so that the positioning elastic piece 610 can abut a sidewall of the card tray 1000, thereby fixing the card tray 1000 by friction between the positioning elastic piece 610 and the sidewall of the card tray 1000.

The sidewall of the card tray 1000 is provided with a positioning groove 1001 adapted to the positioning elastic piece 610, and when the card tray 1000 is inserted into the card mounting space 600, the positioning elastic piece 610 is inserted into the positioning groove 1001, to position the card tray 1000.

The electronic device disclosed in the embodiments of this application may be a device such as a mobile phone, a tablet computer, an e-book reader, or a wearable device (such as smart glasses). A specific type of the electronic device is not limited in the embodiments of this application.

It should be noted that, in this specification, terms "comprise", "include", and any variants thereof are intended to cover a non-exclusive inclusion. Therefore, a process, a method, an object, or an apparatus that includes a series of elements not only includes such elements, but also includes other elements not specified expressly, or may include inherent elements of the process, method, object, or apparatus. Without more limitations, elements defined by the sentence "comprising one" does not exclude that there are still other same elements in the processes, methods, objects, or apparatuses. In addition, it should be noted that, the scope of the method and the apparatus in the embodiments of this application is not limited to a shown sequence or a discussed sequence to perform functions, and may further include performing functions in a basically simultaneous manner or a converse sequence based on the involved functions, for example, the described method may be performed in a sequence different from the description, and various steps may be added, removed, and combined. In addition, features described by referring to some examples may be combined in other examples.

The embodiments of this application have been described above with reference to the accompanying drawings. This application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A card socket apparatus, comprising a mainboard, a mainboard upper cover, a support, a first flexible circuit board, and a second flexible circuit board, wherein
the mainboard is provided with a first opening, and the mainboard upper cover and the support are separately fixed on two sides of the mainboard;
the first flexible circuit board is arranged on the mainboard upper cover, the first flexible circuit board comprises a first card socket and a first electrical connection portion, the first electrical connection portion is electrically connected to the first card socket, and the first card socket is adapted to connect to a card;
the second flexible circuit board is arranged on the support, the second flexible circuit board comprises a second card socket and a second electrical connection portion, the second electrical connection portion is electrically connected to the second card socket, and the second card socket is adapted to connect to a card;
the first card socket and the second card socket are separately arranged opposite to the first opening, and the first card socket, the second card socket, and the first opening jointly form a card mounting space; and
the first electrical connection portion and the second electrical connection portion are separately electrically connected to the mainboard.

2. The card socket apparatus according to claim 1, wherein the mainboard is provided with a first electrical connector and a second electrical connector, wherein
the first electrical connection portion is in insertion fit with the first electrical connector, and the first electrical connection portion is electrically connected to the mainboard by the first electrical connector; and
the second electrical connection portion is in insertion fit with the second electrical connector, and the second electrical connection portion is electrically connected to the mainboard by the second electrical connector.

3. The card socket apparatus according to claim 2, wherein the first electrical connector and the second electrical connector are both located outside the card mounting space, an end portion of the first electrical connection portion extends out of the card mounting space and is in insertion fit with the first electrical connector, and an end portion of the second electrical connection portion extends out of the card mounting space and is in insertion fit with the second electrical connector.

4. The card socket apparatus according to claim 1, wherein the first card socket comprises a first socket body and a first elastic piece, the first elastic piece protrudes from the first socket body toward the card mounting space, the first electrical connection portion comprises a first metal wire, one end of the first metal wire is electrically connected to the first elastic piece by the first socket body, and the other end of the first metal wire is electrically connected to the mainboard.

5. The card socket apparatus according to claim 4, wherein the first flexible circuit board comprises a first insulation layer and a first metal layer, a partial surface of the first metal layer is provided with the first insulation layer, and the first elastic piece is formed by stamping the first metal layer not provided with the first insulation layer.

6. The card socket apparatus according to claim 1, wherein the second card socket comprises a second socket body and a second elastic piece, the second elastic piece protrudes from the second socket body toward the card mounting space, the second electrical connection portion comprises a second metal wire, one end of the second metal wire is electrically connected to the second elastic piece by the second socket body, and the other end of the second metal wire is electrically connected to the mainboard.

7. The card socket apparatus according to claim 6, wherein the second flexible circuit board comprises a second insulation layer and a second metal layer, a partial surface of the second metal layer is provided with the second insulation layer, and the second elastic piece is formed by stamping the second metal layer not provided with the second insulation layer.

8. The card socket apparatus according to claim 1, wherein one side of the mainboard upper cover that is toward the mainboard is provided with a first strip protrusion and a second strip protrusion, the first strip protrusion and the second strip protrusion are separately located on two opposite sides of the first card socket, and the first strip protrusion and the second strip protrusion form at least a partial sidewall of the card mounting space; and
one side of the support that is toward the mainboard is provided with a third strip protrusion and a fourth strip protrusion, the third strip protrusion and the fourth strip protrusion are located on two opposite sides of the second card socket, and the third strip protrusion and the fourth strip protrusion form at least a partial sidewall of the card mounting space.

9. The card socket apparatus according to claim 1, wherein the card socket apparatus further comprises an ejector rod mechanism, the ejector rod mechanism comprises an ejector rod and a rotary member, a first end of the card mounting space is an open end, the rotary member is located on a second end of the card mounting space and is rotatably arranged on the mainboard upper cover, the second strip protrusion is provided with a guide groove, the ejector rod is slidably arranged in the guide groove, the ejector rod is located on the second end of the card mounting space and is rotatably connected to a first end of the rotary member, and a second end of the rotary member is a push end for removing a card.

10. The card socket apparatus according to claim 1, wherein the first electrical connection portion is a strip structure portion, a first end of the first electrical connection portion is connected to the first card socket, and a second end of the first electrical connection portion penetrates through the card mounting space and is electrically connected to the mainboard; and
the second electrical connection portion is a strip structure portion, a first end of the second electrical connection portion is connected to the second card socket, and a second end of the second electrical connection portion penetrates through the card mounting space and is electrically connected to the mainboard.

11. The card socket apparatus according to claim 1, wherein a part of the first electrical connection portion that penetrates through the card mounting space is a first part, a part of the second electrical connection portion that penetrates through the card mounting space is a second part, and the first part and the second part are separately attached to two opposite board surfaces of the mainboard.

12. An electronic device, comprising a card socket apparatus;
wherein the card socket apparatus comprises a mainboard, a mainboard upper cover, a support, a first flexible circuit board, and a second flexible circuit board, wherein
the mainboard is provided with a first opening, and the mainboard upper cover and the support are separately fixed on two sides of the mainboard;
the first flexible circuit board is arranged on the mainboard upper cover, the first flexible circuit board comprises a first card socket and a first electrical connection portion, the first electrical connection portion is electrically connected to the first card socket, and the first card socket is adapted to connect to a card;
the second flexible circuit board is arranged on the support, the second flexible circuit board comprises a second card socket and a second electrical connection portion, the second electrical connection portion is electrically connected to the second card socket, and the second card socket is adapted to connect to a card;
the first card socket and the second card socket are separately arranged opposite to the first opening, and the first card socket, the second card socket, and the first opening jointly form a card mounting space; and
the first electrical connection portion and the second electrical connection portion are separately electrically connected to the mainboard.

13. The electronic device according to claim 12, further comprising a card tray, wherein the card tray is detachably adapted to the card mounting space, the card tray is provided with a first card mounting groove and a second card mounting groove, the first card mounting groove is arranged corresponding to the first card socket, the second card mounting groove is arranged corresponding to the second card socket, and in a case that a first card is mounted in the first card mounting groove, the first card is electrically connected to the first card socket; and in a case that a second card is mounted in the second card mounting groove, the second card is electrically connected to the second card socket.

14. The electronic device according to claim 12, wherein the mainboard is provided with a first electrical connector and a second electrical connector, wherein
the first electrical connection portion is in insertion fit with the first electrical connector, and the first electrical connection portion is electrically connected to the mainboard by the first electrical connector; and
the second electrical connection portion is in insertion fit with the second electrical connector, and the second electrical connection portion is electrically connected to the mainboard by the second electrical connector.

15. The electronic device according to claim 14, wherein the first electrical connector and the second electrical connector are both located outside the card mounting space, an end portion of the first electrical connection portion extends out of the card mounting space and is in insertion fit with the first electrical connector, and an end portion of the second electrical connection portion extends out of the card mounting space and is in insertion fit with the second electrical connector.

16. The electronic device according to claim 12, wherein the first card socket comprises a first socket body and a first elastic piece, the first elastic piece protrudes from the first socket body toward the card mounting space, the first electrical connection portion comprises a first metal wire, one end of the first metal wire is electrically connected to the first elastic piece by the first socket body, and the other end of the first metal wire is electrically connected to the mainboard.

17. The electronic device according to claim 16, wherein the first flexible circuit board comprises a first insulation layer and a first metal layer, a partial surface of the first metal layer is provided with the first insulation layer, and the first elastic piece is formed by stamping the first metal layer not provided with the first insulation layer.

18. The electronic device according to claim 12, wherein the second card socket comprises a second socket body and a second elastic piece, the second elastic piece protrudes from the second socket body toward the card mounting space, the second electrical connection portion comprises a second metal wire, one end of the second metal wire is electrically connected to the second elastic piece by the second socket body, and the other end of the second metal wire is electrically connected to the mainboard.

19. The electronic device according to claim 18, wherein the second flexible circuit board comprises a second insulation layer and a second metal layer, a partial surface of the second metal layer is provided with the second insulation layer, and the second elastic piece is formed by stamping the second metal layer not provided with the second insulation layer.

20. The electronic device according to claim 12, wherein one side of the mainboard upper cover that is toward the mainboard is provided with a first strip protrusion and a second strip protrusion, the first strip protrusion and the second strip protrusion are separately located on two opposite sides of the first card socket, and the first strip protrusion and the second strip protrusion form at least a partial sidewall of the card mounting space; and
one side of the support that is toward the mainboard is provided with a third strip protrusion and a fourth strip protrusion, the third strip protrusion and the fourth strip protrusion are located on two opposite sides of the second card socket, and the third strip protrusion and the fourth strip protrusion form at least a partial sidewall of the card mounting space.

* * * * *